United States Patent [19]

Boone et al.

[11] Patent Number: 4,506,627

[45] Date of Patent: Mar. 26, 1985

[54] MARKING APPARATUS

[75] Inventors: Joe P. Boone, Lawton, Okla.; William J. Head, Ravenna; Steven L. Kitz, Uniontown, both of Ohio

[73] Assignee: The Goodyear Tire & Rubber Company, Akron, Ohio

[21] Appl. No.: 579,918

[22] Filed: Feb. 13, 1984

[51] Int. Cl.³ .............................................. B05C 5/02
[52] U.S. Cl. .................................. 118/708; 118/410; 118/415
[58] Field of Search ............... 118/410, 411, 412, 415, 118/407, 419, 420, 305, 307, 708; 427/286, 284; 401/193; 425/173; 156/123, 116

[56] References Cited

U.S. PATENT DOCUMENTS

| 2,065,298 | 12/1936 | Abbott | 401/193 |
| 2,963,739 | 12/1960 | Whitehurst et al. | 118/407 |
| 3,186,378 | 6/1965 | Davis | 118/415 |
| 4,106,965 | 8/1978 | Lee | 156/123 |
| 4,249,477 | 2/1981 | Christie et al. | 118/415 |

Primary Examiner—John P. McIntosh
Attorney, Agent, or Firm—L. R. Drayer

[57] ABSTRACT

A marking apparatus that is useful for marking a line upon a ridge protruding from a surface of a continuously passing elongated article is disclosed. A stylus member of the marking apparatus has a notch in its foot, through which the ridge on the article passes. A tracking arm member is pivotally attached to a bar member, and supports the stylus member, so that the stylus member can follow the track of the ridge even if the article wanders from side to side as it passes the marking apparatus. Marking fluid, stored in a reservoir, passes through a hollow tube and a bore through the stylus member which communicates with the notch in the foot of the stylus member.

7 Claims, 7 Drawing Figures

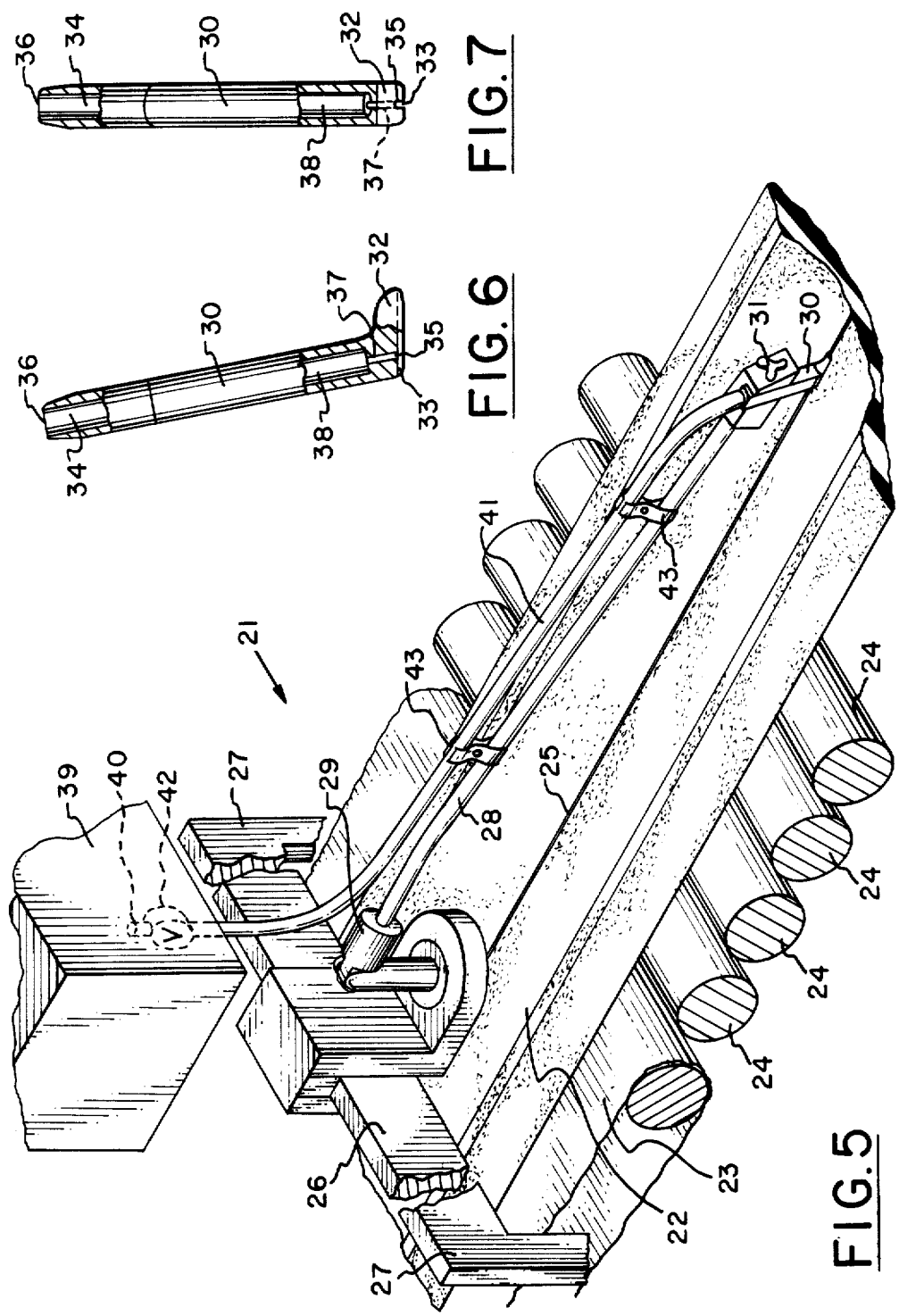

MARKING APPARATUS

BACKGROUND OF THE INVENTION

The present invention relates to a marking apparatus for marking a line upon an elongated article that is continuously moving past the marking apparatus, and more particularly to a marking apparatus for making a line that is guided by a ridge protruding from a surface of the article that is to be marked.

U.S. Pat. No. 4,106,965 teaches an apparatus for making a visible reference line on a continuously extruded body of rubbery material, such as a tread for a pneumatic tire. The apparatus taught in that patent has a plurality of rotating wheels that rest upon the extrudate and a transfer roller for transferring the marking fluid from a reservoir to the article that is to be marked. The weight of the apparatus, as well as that of the marking fluid in the reservoir, is passed through the rotating wheels to the extrudate. An extrudate of a soft material, such as the elastomeric compounds used in the treads of some race car tires, may be permanently deformed by the force transferred through the rotating wheels. An apparatus according to the present invention may be made much more lightweight than this prior art apparatus, and because it has fewer moving parts is less susceptible to mechanical failures. Other advantages of a marker according to the present invention over prior art markers will be pointed out later in this specification.

Simply put, a marking apparatus according to the present invention may be used to mark a line upon a ridge protruding from a surface of an elongated object that is continuously moving past the marking apparatus in a direction that is longitudinal with respect to the elongated article. After the marking has taken place the elongated article may be cut into lengths or rolled around a core. Examples of elongated articles that may be marked with lines by the marking apparatus are treads for tires, tubing, hoses and belts. The lines made by the marking apparatus may be used as a location reference or for idendification purposes.

There is provided in accordance with an aspect of the present invention a marking apparatus comprising: a bar member supported by a means for support; a tracking arm member having first and second ends, the first end of said tracking arm member being pivotally attached to said bar member, said tracking arm member extending generally in a direction transverse to said bar member; a stylus member attached to said tracking arm member near the second end of the tracking arm member, said stylus member having a foot with a notch therein, said notch being oriented parallel with the longitudinal axis of said tracking arm member, said stylus member having a bore therethrough with first and second ends, the first end of said bore communicating with the notch in said foot, said bore having a cross-sectional width at its first end that is less than the cross-sectional width of said notch; a reservoir for marking fluid, said reservoir having an outlet; and, a hollow tube having a pair of ends, one end of said hollow tube communicating with the outlet of said reservoir and the other end of said hollow tube communicating with the second end of the bore through the stylus member.

BRIEF DESCRIPTION OF THE DRAWINGS

To acquaint persons skilled in the art most closely related to the present invention, certain preferred embodiments thereof illustrating a best mode now contemplated for putting the invention into practice are described herein by and with reference to the annexed drawings forming a part of the specification. The embodiments shown and described herein are illustrative, and as will become apparent to those skilled in the art can be modified in numerous ways within the scope of the invention defined in the claims hereof.

In the drawings:

FIG. 5 is a perspective view of a marking apparatus according to the invention;

FIG. 6 is a side view, partially broken away, of the scribe member of the marking apparatus; and FIG. 7 is a front view, partially broken away, of the scribe member of the marking apparatus.

DETAILED DESCRIPTION OF THE INVENTION

Figure 1:
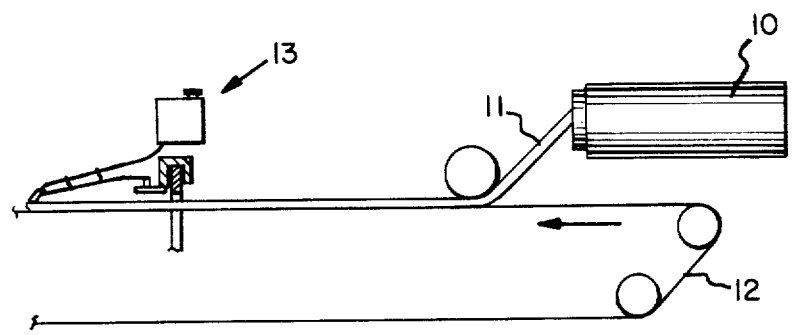
FIG. 1 is a schematic representation of a marking apparatus according to the invention in its operative position.

Referring to FIG. 1, there is shown a schematic representation of a marking apparatus according to the invention in its operative position. An extruder 10 of the type well known in the extrusion art forms an elongated article 11 by forcing an elastomeric material, such as a rubber compound, through a forming die. An endless converyor belt 12 continuously moves the elongated article along a path that is longitudinal with respect to the elongated article, as indicated by an arrow in FIG. 1. A marking apparatus 13 is located downstream from the extruder and makes a continuous line upon the elongated article, as the elongated article is continuously moved past the marking device. It is understood that the elongated article to be marked may be cut into lengths or wound upon a core in a later stage of the production process. It is further understood if the elongated article is manufactured by calendering, or even is simply unwound from a pre-manufactured roll, the marking apparatus of the present invention may still be advantageously used to mark a line upon the article.

Figure 2:
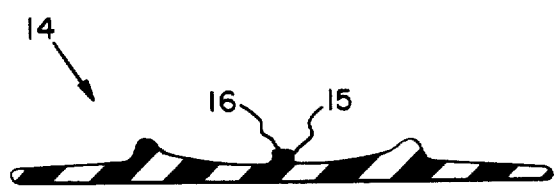
FIGS. 2, 3 and 4 are cross-sectional views of articles of the type that may have lines marked upon them by a marking apparatus according to the invention.
Figure 3:
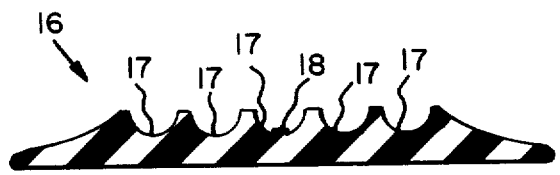
Figure 4:
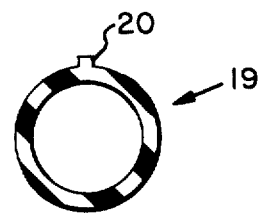

FIGS. 2, 3 and 4 are cross-sectional views of elongated articles that may have lines made on them by a marking apparatus according to the invention. A typical tread strip 14 intended to be assembled with a tire is shown in FIG. 2. A ridge 15 protrudes from a surface of the tread at its centerline. The ridge 15 is formed by a notch in the forming die located in the head of an extruder. The ridge must be large enough so that its peak surface 16 can have a marking fluid applied thereon, but yet small enough that when the assembled tire is vulcanized the ridge can be merged with the remaining body of the tread without affecting the desired contour of the vulcanized tire. As will be more fully described later, a ridge on the surface of the extruded article will serve as a guide for the stylus member of the marking apparatus. While the articles shown in FIGS. 2, 3 and 4 have only a single ridge located at their respective centerlines, it is understood that a marking apparatus according to the invention can be guided by a ridge located other than at the articles centerline, or may use more than one stylus member to mark a line on the peak surface of more than one ridge on the article. A person working in the tire making art may desire a visibly distinguishable line to be marked at the center of a tread to act as a reference line when placing the tread on a tire carcass, or for determining if the tire has been properly aligned in a curing mold.

It is believed that the ridge protruding from the surface of an article to be marked may be of any desired dimensions, but preferably in the range of from 1.3 mm (0.05 inches) in height and width to about 1.8 mm (0.07 inches) in height and width. While the ridges may be "V" shaped or "U" shaped, it is preferable that they be rectangular.

FIG. 3 illustrates a newer type of tread strip 16, as is taught in U.S. Pat. No. 4,308,083. This new type of tread strip 16 has a plurality of depressed areas 17 that will align with the groove areas of the tread of the vulcanized tire. A ridge 18 protrudes from the tread strip at its centerline. A prior art marking apparatus of the type taught in U.S. Pat. No. 4,106,965 requires a broad surface to ride against, such as the tread strip 14 of FIG. 2 has. The stylus member of a marking apparatus according to the present invention is much narrower than the prior art marker though, and can be used to mark on ridges in depressions where the prior art markers could not effectively be used.

FIG. 4 is a cross-section of a hollow tubular article 19, such as an inner tube or a hose. Such articles are commonly extruded and may have a notch 20, of the type already described, protruding from an outside surface to be marked upon by the marking apparatus of the present invention.

The articles shown in FIGS. 2, 3 and 4 are merely examples of articles that may have lines marked thereon by a marking apparatus according to the invention, and virtually any extruded article, of sufficient size, may be marked with the marking apparatus.

Referring next to FIG. 5, there is shown a perspective view of a marking apparatus 21 in accordance with the preferred embodiment of the invention, in its operative position for marking a line upon a tread strip 22 of the type illustrated in FIG. 2. The tread strip is an elongated article that is continuously moving past the marking apparatus in a direction that is longitudinal with respect to the elongated article. In this instance a conveyor belt 23 carries the elongated article. If desired, one or more shrinkage rolls 24 may be employed in the conveyor system. The elongated article has a surface with a ridge 25 protruding therefrom, and extending in a longitudinal direction with respect to the elongated article.

The marking apparatus has a bar member 26 supported by a means for support 27. Preferably the bar member 26 is oriented horizontally, but a vertical bar member could be employed without deviating from the scope of the invention. The bar member is preferably oriented in a direction transverse to the direction of motion of the elongated article, and is spaced apart from the surface of the elongated article.

A tracking arm member 28 has first and second ends, the first end of the tracking arm member being pivotally attached to the bar member 26. While any number of means for making a pivotal connection between the tracking bar member and the bar member may be employed, it is recommended that the tracking arm member be capable of pivoting in both the horizontal and vertical directions so that it can track the ridge protruding from the article if the article wanders from side to side of the conveyor belt or should vary in vertical height. Of course, the pivotal attachment allows the marking apparatus to be easily used for marking elongated articles of different thicknesses. The tracking arm member extends in a direction that is generally transverse to the bar member. Put another way, the tracking arm member is oriented generally in the direction of motion of the elongated article, and is slanted towards the surface of the elongated article, but is not in direct contact with the elongated article. The tracking arm member is slideable along the length of the bar member.

A stylus member 30 is attached to the tracking arm member 28 near the second end of the tracking arm member. Preferably the stylus member is secured in place with respect to the tracking arm member by securing means such as a set screw 31, or a clip, so that the stylus member can be easily removed for cleaning or replacement. As used herein "stylus" means an instrument used for writing or marking. The structure and functioning of the stylus member may be better understood by referring to FIGS. 6 and 7, which are side and frontal view of the stylus respectively, in conjunction with FIG. 5. The stylus member 30 has a foot 32 with a notch 33 therein. The notch is oriented in the direction of motion of the elongated article, when the stylus is in its operative position. Preferably, the notch has cross-sectional dimensions such that the ridge 25 protruding from the surface of the elongated article may pass through the notch when the foot of the stylus member rests on the surface of the continuously moving elongated article, as shown in FIG. 5. Making a rough analogy, the tracking arm member and stylus member follow a ridge protruding from the surface of a constantly passing elongated article in a manner that is somewhat analogous to the way that a phonograph needle and tone arm follow the grooves on a phonograph record. However, in the case of a phonograph the needle rides between the ridges of a record disk, while in the present invention the ridge on the elongated article passes through the notch in the stylus member. The stylus member has a bore 34 therethrough, through which the marking fluid flows. The bore 34 has first 35 and second 36 ends, with the first end of the bore communicating with the notch 33 in the foot of the stylus member, and having a cross-sectional width that is less than the cross-sectional width of the notch. Preferably, the bore through the stylus member is divided along its length into first 37 and second 38 portions, the first portion 37 including the first end 35 of the bore and having a smaller cross-sectional area than the second portion 38. The bore may be most conveniently made with a circular cross-section, and a working embodiment has been manufactured in which the first portion of the bore had a diameter of 1.07 mm (0.042 inches which is the diameter of a #58 twist drill), and the second portion of the bore had a diameter of 4.78 mm (0.188 inches). The stylus member and tracking arm member may be manufactured using any suitable material such as metal or plastic, but they should be as light weight as possible to reduce the possibility of marring the surface of the article being marked upon.

A reservoir 39, having an outlet 40 is used to store a supply of marking fluid. Preferably the reservoir is located higher than the stylus member 30 such that gravitational force will cause the marking fluid to flow through a hollow tube 41 and then through the bore through the stylus member. It is convenient to locate a valve 42 at the reservoir outlet to stop the flow of marking fluid when the marking apparatus is not being used, and to control the rate of flow of the marking fluid. The hollow tube 41 has a pair of ends; one end communicating with the outlet of the reservoir, and the other end communicating with the second end of the bore through the stylus member. One or more clips 43 may be used to guide the hollow tube along the length of the tracking arm member. Preferably, the hollow tube comprises a material that does not react chemically with the marking fluid. The easy removal of the hollow tube for cleaning or replacement is felt to be an advantage over more complicated prior art marking devices.

Of course, the physical properties of a marking fluid to be used with the marking apparatus of the invention are important. If the marking fluid is too thick, it may eventually clog up the bore through the stylus member, and may not flow at a smooth and steady rate. If the marking fluid is too thin, it may flow too quickly and run off of the protruding ridge onto the rest of the surface of the elongated article. It has been found that a marking fluid having a viscosity of between about 2,300 centipoise and about 3,300 centipoise, as measured by a Brookfield Viscometer, (spindle number 3, at 30 revolutions per minute) works satisfactorily with one embodiment of a marking apparatus manufactured according to the invention.

While certain representative embodiments and details have been shown for purposes of illustrating the invention, it will be apparent to those skilled in the art that various changes and modifications may be made therein without departing from the spirit or scope of the invention.

What is claimed is:

1. A marking apparatus comprising:
   (a) a bar member supported by a means for support;
   (b) a tracking arm member having first and second ends, the first end of said tracking arm member being pivotally attached to said bar member, said tracking arm member extending generally in a direction transverse to said bar member;
   (c) a stylus member attached to said tracking arm member near the second end of the tracking arm member, said stylus member having a foot with a notch therein, said notch being oriented parallel with the longitudinal axis of said tracking arm member, said stylus member having a bore therethrough with first and second ends, the first end of said bore communicating with the notch in said foot, said bore having a cross-sectional width at its first end that is less than the cross-sectional width of said notch;
   (d) a reservoir for marking fluid, said reservoir having an outlet; and
   (e) a hollow tube having a pair of ends, one end of said hollow tube communicating with the outlet of said reservoir and the other end of aid hollow tube communicating with the second end of the bore through said stylus member.

2. A marking apparatus as described in claim 1 wherein said bar member is oriented horizontally.

3. A marking apparatus as described in claim 1 wherein said reservoir is located higher than said stylus member such that gravitational force will cause marking fluid in the reservoir to flow through the hollow tube and the bore through the stylus member.

4. A marking apparatus as described in claim 3 wherein the bore through said stylus member is divided along its length into first and second portions, said first portion including the first end of the bore and having a smaller cross-sectional area than said second portion.

5. A marking apparatus as described in claim 1 wherein the bore through said stylus member is divided along its length into first and second portions, said first portion including the first end of the bore and having a smaller cross-sectional area than said second portion.

6. A marking apparatus as described in claim 1 wherein said tracking arm member is slideable along the length of said bar member.

7. A marking apparatus as described in claim 1 wherein the outlet of said reservoir comprises a shut-off valve.

* * * * *